United States Patent
Chen et al.

(10) Patent No.: US 7,341,790 B2
(45) Date of Patent: Mar. 11, 2008

(54) TONER FUSER MEMBER WITH RELEASE LAYER FORMED FROM SILSESQUIOXANE-PHENOLIC RESIN COMPOSITION

(75) Inventors: Jiann-Hsing Chen, Fairport, NY (US); Joseph A. Pavlisko, Pittsford, NY (US); Muhammed Aslam, Rochester, NY (US); Wayne T. Ferrar, Fairport, NY (US)

(73) Assignee: Eastman Kodak Company, Rochester, NY (US)

( * ) Notice: Subject to any disclaimer, the term of this patent is extended or adjusted under 35 U.S.C. 154(b) by 242 days.

(21) Appl. No.: 11/017,280

(22) Filed: Dec. 20, 2004

(65) Prior Publication Data

US 2005/0142354 A1    Jun. 30, 2005

Related U.S. Application Data

(60) Provisional application No. 60/533,126, filed on Dec. 24, 2003.

(51) Int. Cl.
*B32B 25/20* (2006.01)

(52) U.S. Cl. ............. 428/447; 428/450; 525/474

(58) Field of Classification Search ............... None
See application file for complete search history.

(56) References Cited

U.S. PATENT DOCUMENTS

| | | | | |
|---|---|---|---|---|
| 4,722,881 A | * | 2/1988 | Ueno et al. | 430/192 |
| 5,362,833 A | * | 11/1994 | Chen et al. | 528/25 |
| 5,708,948 A | * | 1/1998 | Chen et al. | 399/329 |
| 5,778,295 A | | 7/1998 | Chen et al. | 399/329 |
| 5,853,892 A | | 12/1998 | Chen et al. | 428/421 |
| 6,537,741 B2 | | 3/2003 | Chen et al. | 430/523 |

* cited by examiner

*Primary Examiner*—Kuo-Liang Peng
(74) *Attorney, Agent, or Firm*—Carl R. Ruoff

(57) ABSTRACT

A toner fuser member contains a substrate on which is disposed a toner release surface layer formed from a composition that includes a silsesquioxane and a curable phenolic resin. On curing, the composition forms an interpenetrating polymer network of the silsesquioxane and phenolic resin.

16 Claims, No Drawings

TONER FUSER MEMBER WITH RELEASE LAYER FORMED FROM SILSESQUIOXANE-PHENOLIC RESIN COMPOSITION

This application claims benefit of application Ser. No. 60/533,125 filed Dec. 24, 2003.

FIELD OF THE INVENTION

This invention relates in general to electrostatographic imaging and, in particular, to toner fuser members. More particularly, this invention relates to a fuser member having a release layer formed from a composition containing a silsesquioxane and a curable phenolic resin.

BACKGROUND OF THE INVENTION

In electrostatographic imaging and recording processes such as electrophotographic copying, an electrostatic latent image formed on a photoconductive surface is developed with a thermoplastic toner powder, which is thereafter fused to a receiver. The fuser member can be a roll, belt, or any surface having the suitable shape for fixing thermoplastic toner powder to the receiver. The fusing step commonly includes of passing the receiver, for example, a sheet of paper on which toner powder is distributed in an image-wise pattern, through the nip of a pair of rolls. At least one of the rolls is heated; in the case where the fuser member is a heated roll, a smooth resilient surface is bonded either directly or indirectly to the core of the roll. Where the fuser member is in the form of a belt, it is preferably a flexible endless belt having a smooth, hardened outer surface that passes around the heated roller. A persistent problem with electrostatographic fusing systems, known as offset, is the adhesion of heat-softened toner particles to the surface of the fuser member rather than the receiver during passage through the rolls. Any toner remaining adhered to the fuser member can cause a false offset image to appear on the next sheet that passes through the rolls and can also degrade the fusing performance of the member. Another possible problem is degradation of the member surface caused by continued heating, which results in an uneven surface and defective patterns in thermally fixed images.

Toner fuser rolls are composed of a cylindrical core that may include a heat source in its interior, and a resilient covering layer formed directly or indirectly on the surface of the core. A thin layer of a suitable primer is advantageously coated on the surface of the core in order to improve bonding of the layer. Roll covering layers are commonly made of fluorocarbon polymers or silicone polymers, for example, poly(dimethylsiloxane) polymers of low surface energy, which minimizes adherence of toner to the roll. Frequently, release oils composed of, for example, poly(dimethylsiloxanes) are also applied to the fuser roll surface to prevent adherence of toner to the roll. Such release oils may interact with the resilient layer upon repeated use and in time cause swelling, softening, and degradation of the roll. Silicone rubber covering layers that are insufficiently resistant to release oils and cleaning solvents are also susceptible to delamination of the roll cover after repeated heating and cooling cycles.

Toner fuser belts are composed of a continuous flexible material having superior resistance to heat and a smooth surface. The belt substrate can be metallic or polymeric. The surface of the belt is composed of a thinly coated, low surface energy polymer such as a fluorocarbon or a silicone resin. There is a need for coating compositions, which adhere strongly to the belt and form a hard, tough surface that is resistant to wear and cracking. The surface should also be resistant to cleaning solvents and fluids.

In electrostatographic imaging processes dry developers can be used to form an image on a receiving surface such as a sheet of paper. Dry developers usually include a toner powder and carrier particles. Carrier particles and toner particles have different triboelectric values. As the developer mixture is agitated, the particles rub together and the toner and carrier particles acquire opposite electric charges and cling together. In the subsequent development step the somewhat higher opposite charge of the electrostatic latent image draws the colored toner from the carrier and develops the image. Various addenda are frequently used to improve the properties of the toner and carrier particles.

Toners include, as a major component, the binder and, as minor components, a colorant, and a charge control agent. The binder can be any resin having properties suitable for dry toners. Many such resins are known, but thermoplastic resins that are fixable by fusing are especially useful. When a dry toner powder image is transferred from one surface to another, defects in the image can occur. U.S. Pat. No. 4,758,491 teaches that the addition of low surface energy addenda, especially polymers containing organopolysiloxane segments, may alleviate such defects.

Carrier particles have magnetizable irregular particles that are usually coated with a film of a polymeric material, which helps develop the triboelectric charge and aids the transfer of the toner. The coating material must adhere well to the carrier particle because the toner charge decreases as the polymer wears off. Polymers with low surface energy properties are especially useful for coating carrier particles.

Recent electrophotographic apparatus and processes are disclosed in U.S. Pat. Nos. 5,089,363 and 5,411,779, the disclosures of which are incorporated herein by reference.

U.S. Pat. No. 5,411,779 describes an apparatus having an image-fixing belt with a polyimide resin inner layer and a fluoroplastic outer layer that produces unglossed, matte images. Other fuser belt systems are described in U.S. Pat. Nos. 5,200,284; 5,233,008; 5,330,840; 5,362,833; and 5,529,847, the disclosures of which are incorporated herein by reference.

The ferrotyping belt used for the production of high gloss toner images typically has of a metal or an organic polymeric substrate on which is coated a release layer. The toner is generally fused in a heated nip to a receiver, which then continues to travel along the belt without releasing until the toner is cool. To avoid the use of a release oil, the release layer of the fuser belt must have low surface energy.

Toner fuser belts are composed of a continuous smooth, heat-resistant, flexible material on a metallic or polymeric substrate. A release layer applied to the belt substrate is a thinly coated, low surface energy polymer such as a fluorocarbon or a cross-linked silicone resin. Such release layers, however, often display poor mechanical properties, including inadequate adhesion to the metal support, and are susceptible to rapid wear upon repeated contact with abrasive receiving sheets such as bond paper or uncoated laser print paper.

There remains an ongoing need for fuser belts having durable surface layer compositions that adhere well to the substrate, form a hard, tough surface that is resistant to wear, cracking and solvents, and are capable of producing multiple high quality, high gloss toner images, including multicolor images. This need is well met by the release layer composition of the present invention.

SUMMARY OF THE INVENTION

The present invention is directed to a toner fuser member that includes a substrate, on which is disposed a toner release surface layer formed from a composition that has a silsesquioxane and a curable phenolic resin. On curing, the composition forms an interpenetrating polymer network of the silsesquioxane and phenolic resin.

DETAILED DESCRIPTION OF THE INVENTION

In accordance with the present invention, a toner fuser member, preferably a fuser belt having a surface layer coated on a metallic or an organic polymeric substrate, provides high gloss, durability, and good release of toner images without the need for a release agent such as an oil. The fuser belt, whose substrate preferably includes a polyimide resin, can be employed in a fusing apparatus such as that described in U.S. Pat. No. 5,778,295, the disclosure of which is incorporated herein by reference. Fused toner images, including multicolor images, obtained with the belt exhibit high gloss and excellent clarity.

Silsesquioxanes are a class of inorganic/organic glasses that can be formed at moderate temperatures by a procedure commonly referred to as a "sol-gel" process. In the sol-gel process, silicon alkoxides are hydrolyzed in an appropriate solvent, forming the "sol." The solvent is then removed, resulting in the formation of a cross-linked "gel." A variety of solvents can be used, aqueous, aqueous-alcoholic, and alcoholic solvents being generally preferred. Silsesquioxanes are conveniently coated from acidic alcohols, since the silicic acid form, $RSi(OH)_3$, is quite stable in solution for months under ambient conditions. The extent of condensation is related to the amount of curing a sample receives, temperature, and time being among the two most important variables.

Silsesquioxanes can be represented by the formula $(RSiO_{1.5})_n$, where R is an organic group and n is the number of repeating units. Thus, the prefix "sesqui" refers to a one and one-half stoichiometry of oxygen. The polymers can be prepared by the hydrolysis and condensation of trialkoxysilanes. U.S. Pat. No. 4,027,073 teaches the use of silsesquioxanes as abrasion resistant coatings on organic polymers. Typical applications include scratch resistant coatings on acrylic lenses and transparent glazing materials; the cited patent teaches that a preferred thickness for good scratch resistance is from 2 to 10 µm. U.S. Pat. No. 4,439,509 teaches photoconducting elements for electrophotography that have silsesquioxane coatings having a thickness of 0.5 to 2.0 µm, which is purported to optimize electrical, transfer, cleaning and scratch resistance properties. This teaching contrasts with that of U.S. Pat. No. 4,027,073, which teaches that a preferred thickness of a silsesquioxane layer for good scratch resistance is from 2 to 10 µm. U.S. Pat. No. 4,923,775 teaches that methylsilsesquioxane is preferred since it produces the hardest material in comparison to other alkylsilanes. U.S. Pat. No. 4,595,602 teaches a conductive overcoat of cross-linked "siloxanol-colloidal silica hybrid" having a preferred thickness of from 0.3 to 5.0 µm. The disclosures of all of these cited patents are incorporated herein by reference.

The formula $(RSiO_{1.5})_n$ above, which is sometimes written $[Si(O_{0.5})_3 R_n]$, is a useful shorthand for silsesquioxanes but, except for fully cured silsesquioxane, it does not totally characterize the material. This is important, since silsesquioxanes can be utilized in an incompletely cured state. An additional nomenclature, derived from one described in R. H. Glaser, G. L. Wilkes, C. E. Bronnimann; *Journal of Non-Crystalline Solids,* 113 (1989) 73-87; uses the initials M, D, T, and Q to designate silicon atoms bonded to 1, 2, 3, or 4 oxygen atoms, respectively. The designation T is subdivided to indicate the number of —Si—O—Si— bonds, from 0 to 3, contained in the silsesquioxane structure, i.e., $T^0$, $T^1$, $T^2$, and $T^3$.

In fully cured silsesquioxanes, substantially all silicons are included in $T^3$ structures. The extent of curing of the silsesquioxane can be quantified as the ratio of $T^2$ to $T^3$. The value of this $T^2/T^3$ ratio decreases with an increase in cure, and vice versa. In the silsesquioxanes having the most advantageous properties for inclusion in a toner fusing belt surface layer in accordance with the invention, the ratio of carbon to silicon atoms, i.e., the C:Si ratio, is greater than about 2:1, and the $T^2/T^3$ ratio is from about 0.5:1 to about 0.1:1. The silsesquioxane is a large oligomer or a polymer typically containing more than 10 silsesquioxane subunits, although theoretically there is no upper limit on the number of subunits.

Phenolic resins, which were the earliest commercially developed synthetic polymers, are formed by the reaction of phenol or its substituted derivatives, for example: cresols, xylenols, and butylphenols, with aldehyde compounds such as formaldehyde, acetaldehyde, and furfural. There are two classes of phenolic resins: novolacs and resoles. Novalac resins, which are formed by an acid-catalyzed reaction of a molar excess of a phenol with an aldehyde, i.e., a molar ratio greater than one, are thermoplastic, requiring the addition of a cross-linking agent to form a three-dimensional rigid polymer network. Resole resins, which are formed by a base-catalyzed reaction of a phenol with a molar excess of an aldehyde, i.e., a molar ratio less than one, are thermoset. The phenolic resins employed in the compositions of the present invention are curable novalac resins.

While fuser member surface layers formed from silsequioxane sol-gels have good toner release properties, they tend to be brittle, resulting in poor wear characteristics. A coating composition of the present invention, in which a silsesquioxane is combined with a curable phenolic resin, forms an interpenetrating polymer network (IPN) upon curing, thereby providing a tough release layer having excellent wear characteristics. The coating composition contains the silsesquioxane and phenolic resin in a silsesquioxane:phenolic resin weight ratio preferably of about 1:10 to about 10:1, more preferably, about 1:5 to about 1:1.

The toner release surface layer composition of the present invention, may further include a filler, such as $SiO_2$, $TiO_2$, ZnO, $SnO_2$, or $Al_2O_3$, or mixtures thereof, in an amount ranging from about 1 wt. % to about 30 wt. %. Preferably, the filler is $SiO_2$, in an amount from about 1 wt. % to about 7 wt. %.

The following examples serve to illustrate the present invention:

EXAMPLE 1

Preparation of Comparison Toner Release Surface Layer Composition

To a 2-liter Erlenmeyer flask equipped with a magnetic stirrer is added 220.8 g of propyltrimethoxysilane, 73.2 g of methyltrimethoxysilane, 73.2 g of 3-glycidoxypropyltrimethoxysilane, and 30.0 g of 3-aminopropyltrimethoxysilane. After stirring for a few minutes, 64.8 g of glacial acetic acid, followed by 72 g of water, are added drop-wise from an addition funnel, and 122.79 g of distilled water is added drop-wise from an addition funnel. The reaction mixture becomes exothermic and is cloudy at first but become clear after about half of the water has been added. Following addition of the water, the flask is covered, and its contents are stirred overnight. Then 42 g of a 70 wt. % aqueous suspension of LUDOX™ silica gel, whose pH has been adjusted from 8.7 to 4.3 by the addition of a few drops of acetic acid, is added drop-wise. The mixture is again stirred overnight, and 627.6 g of ethanol is added at low flow rate through a funnel to the reaction mixture to obtain a silsesquioxane composition that has a solids content of about 33 wt. % and is suitable for forming a toner release surface layer.

EXAMPLE 2

Preparation of Toner Release Surface Layer Composition

To a stirred silsesquioxane composition prepared as described in Example 1 is added 493 g of Georgia Pacific GP 7590, which is a 62 wt. % solution of a cross-linkable butylsubstituted phenolic resin in butanol. The resulting composition, which has a solids content of about 35 wt. % and contains the silsesquioxane and the phenolic resin in a weight ratio of approximately 25:75, is employed to form a toner release surface layer in accordance with the present invention.

EXAMPLE 3

Preparation of Comparison Toner Fuser Belt with Silsesquioxane Surface Layer

A seamless and uncoated polyimide resin belt 823 mm (32.4 inches) in diameter and 254 mm in width (10 inches), manufactured by Gunze Co., is cleaned with anhydrous ethanol and wiped with a lint-free cloth. Then 100 g of a water-ethanol solution of silsesquioxane sol-gel prepared substantially as described in Example 1 is mixed for 30 minutes with 0.7 wt. % of DC 190 surfactant. The resulting mixture is then ring coated directly on the polyimide belt at 1.5 inches/second, no underlying primer layer being required. The coated belt is flashed at room temperature for 20 minutes, ramped to a temperature of 150° C. for 4 hours, and cured at 150° C. for 2 hours. The cured toner release surface layer has a thickness of about 5 μm.

EXAMPLE 4

Preparation of Toner Fuser Belt with Surface Layer Containing Silsesquioxane-Phenolic Resin Combination Using 100 g of a phenolic resin-silsesquioxane coating solution prepared substantially as described in Example 2, a toner release surface layer is formed on a seamless and uncoated polyimide resin belt by the procedure described in Example 3. The cured toner release surface layer has a thickness of about 5 μm.

EXAMPLE 5

Measurement of Gloss of Fuser Belts

The Gardner gloss value is essentially a ratio determined by measuring the amount of light reflected off a fuser belt surface at a specific angle measured from a line perpendicular to the belt surface, and dividing the foregoing by the amount of light introduced to the surface at the same angle on the opposite side of the perpendicular line. The angles off the perpendicular line at which the gloss measurements are commonly taken are 20°, 60°, and 85° using a Gardner MICRO-TRI-GLOSS 20-60-85 Glossmeter, available from BYK Gardner USA of Rivers Park Md. The gloss value as measured by the Gardner Glossmeter is often reported as a G next to a number representing the size of the specific angle used in measuring gloss, for example, G20, G60, and G85.

Gloss measurements were made on the comparison toner fuser belt having a silsesquioxane surface layer, prepared as described in Example 3, and on a toner fuser belt having a surface layer containing a silsesquioxane-phenolic resin combination, prepared as describe in Example 4. Gardner gloss levels measured at an angle of 60° are presented as G60 gloss values in TABLE 1 for each of the fuser belts.

TABLE 1

| Fuser Belt | Surface Layer | Belt G60 Gloss | Wear Cycles |
|---|---|---|---|
| Comparison | Silsesquioxane | 112.5 | 54 |
| Invention | Silsesquioxane-Phenolic Resin | 126.6 | 121 |

As shown by the G60 gloss measurement data included in TABLE 1, the toner surface layers of both fuser belts had high gloss values, but that formed from the silsesquioxane-phenolic resin combination was desirably higher than the comparison belt. It should be noted that the measured gloss values of fused toner images using these belts are substantially the same as the fuser belt surface gloss values.

EXAMPLE 6

Wear Tests of Fuser Belts

The wear rates of the comparison belt and the belt of the invention were measured using a Norman Abrasion Wear Tester (Norman Tool Inc., Evansville Ind.). Samples coated on a polyimide belt substrate and having a width of 9/16", and a length of 2" were employed for the wear tests, which were carried out at 350° F. The results reported as the number of cycles required to wear through the surface layer to a depth of 5 μm, are also included in TABLE 1.

As shown by the wear test results for the two fuser belts, the belt of the present invention, whose surface layer comprises the silsesquioxane-phenolic resin combination, exhibited wear resistance that was more than double that of the comparison belt having a silsesquioxane surface layer.

The invention has been described in detail with particular reference to certain preferred embodiments thereof, but it is understood that variations and modifications can be effected within the spirit and scope of the invention, which is defined by the claims that follow.

The invention claimed is:

1. A toner fuser member comprising:
   a substrate; and
   disposed on said substrate, a toner release surface layer formed from a composition that comprises a silsesquioxane having a $T^2/T^3$ ratio of from about 0.5:1 to about 0.1:1 and a curable phenolic resin, said composition forming on curing an interpenetrating polymer network of said silsesquioxane and said phenolic resin.

2. The toner fuser member of claim 1 wherein said composition contains said silsesquioxane and said phenolic resin in a silsesquioxane:phenolic resin weight ratio of about 1:10 to about 10:1.

3. The toner fuser member of claim 2 wherein said composition contains said silsesquioxane and said phenolic resin in a silsesquioxane:phenolic resin weight ratio of about 1:5 to about 1:1.

4. The toner fuser member of claim 1 wherein said composition further comprises a filler selected from the group consisting of $SiO_2$, $TiO_2$, ZnO, $SnO_2$, $Al_2O_3$, and mixtures thereof.

5. The toner fuser member of claim 4 wherein said composition comprises said filler in an amount of about 1 wt. % to about 30 wt. %.

6. The toner fuser member of claim 5 wherein said composition is $SiO_2$ in an amount of about 1 wt. % to about 7 wt. %.

7. The toner fuser member of claim 1 wherein said silsesquioxane has a C:Si ratio greater than about 2:1.

8. The toner fuser member of claim 1 wherein said silsesquioxane is formed from a mixture comprising propyltrimethoxysilane, methyltrimethoxysilane, 3-glycidoxypropyltrimethoxysilane, and 3-aminopropyltrimethoxysilane.

9. The toner fuser member of claim 1 wherein said member is a fuser belt.

10. The toner fuser member of claim 9 wherein said fuser belt comprises a substrate formed of metal.

11. The toner fuser member of claim 10 wherein said metal is selected from the group consisting of steel, stainless steel, aluminum, copper, and nickel.

12. The toner fuser member of claim 9 wherein said fuser belt comprises a substrate formed of a thermoset organic polymeric material.

13. The toner fuser member of claim 12, wherein said thermoset organic polymeric material is selected from the group consisting of a polyimide, a polyamide, a polyamide-imide, a polycarbonate, and a polyester.

14. The fuser member of claim 13 wherein said thermoset organic polymeric material comprises a polyimide.

15. The toner fuser member of claim 1 wherein said surface layer has a thickness of about 1 µm to about 20 µm.

16. The toner fuser member of claim 15 wherein said thickness is about 3 µm to about 10 µm.

* * * * *